June 22, 1954 P. ORAZI 2,681,775
CONVERTIBLE AIRPLANE HAVING AUTO-ROTATABLE SUSTAINING ELEMENTS
Filed May 24, 1951 5 Sheets-Sheet 1
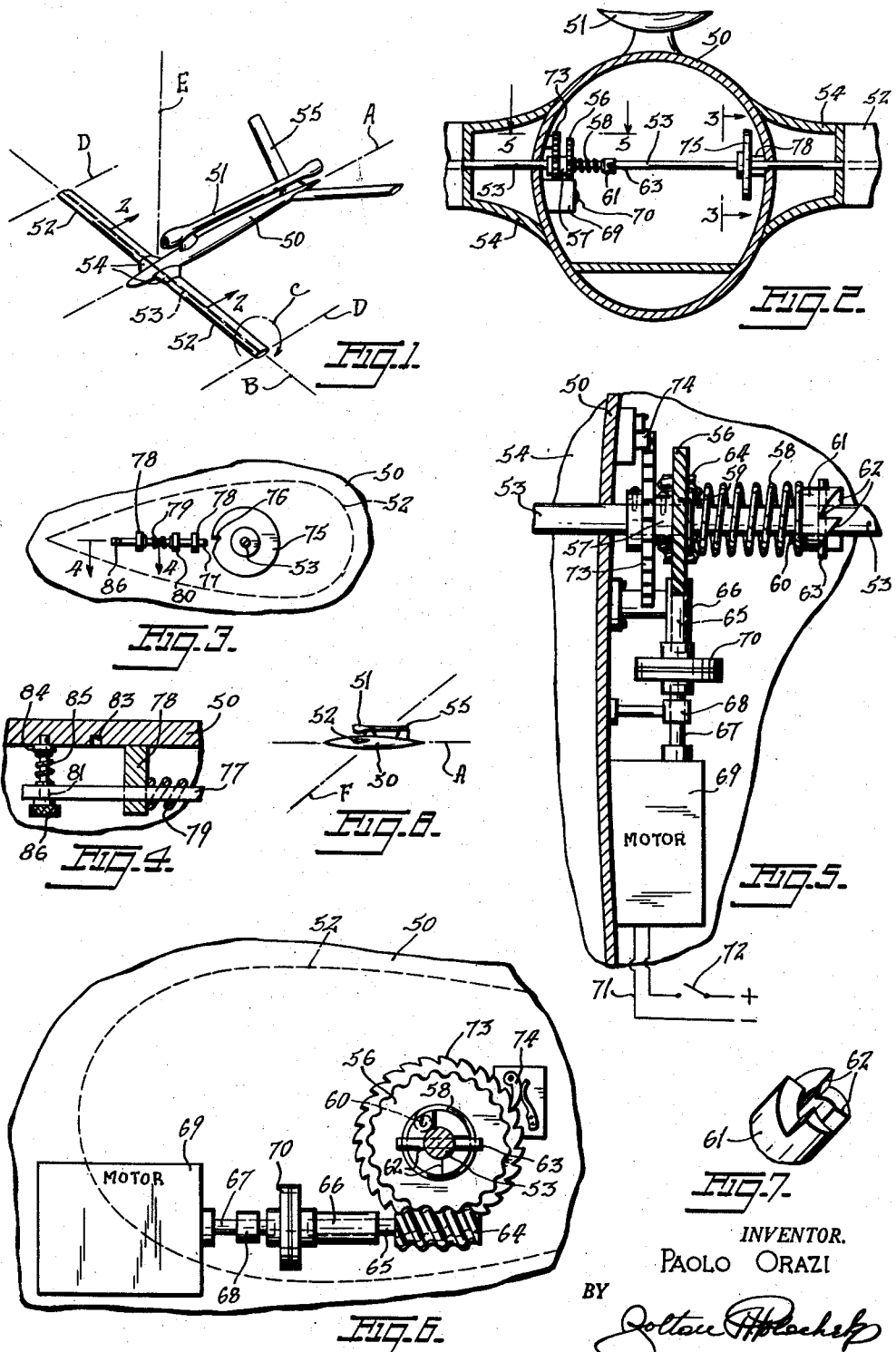
INVENTOR.
PAOLO ORAZI June 22, 1954 P. ORAZI 2,681,775
CONVERTIBLE AIRPLANE HAVING AUTO-ROTATABLE SUSTAINING ELEMENTS
Filed May 24, 1951 5 Sheets-Sheet 2
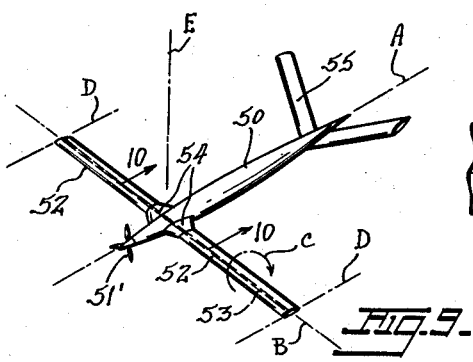
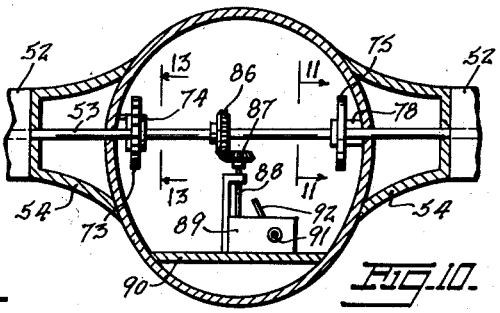
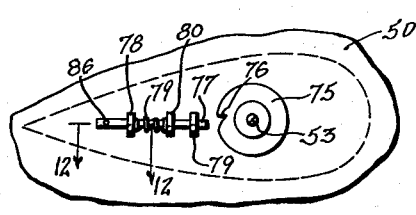
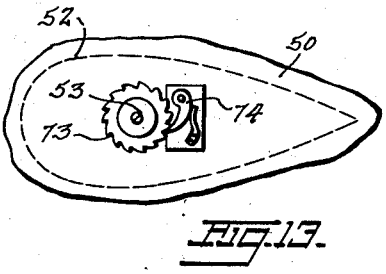
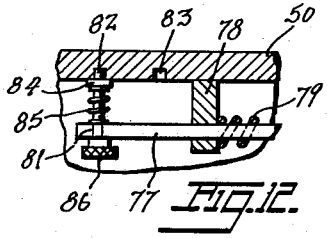
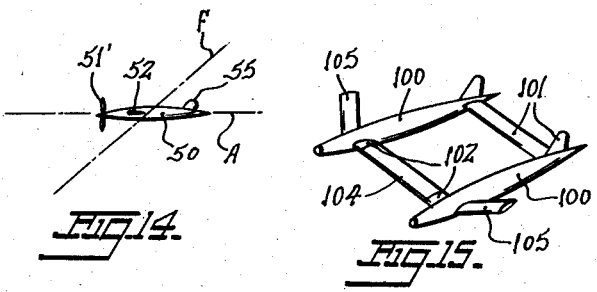
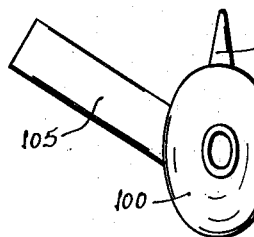
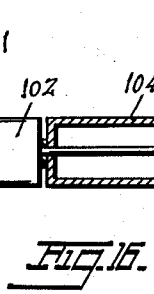
INVENTOR.
PAOLO ORAZI
BY
ATTORNEY June 22, 1954  P. ORAZI  2,681,775
CONVERTIBLE AIRPLANE HAVING AUTO-ROTATABLE SUSTAINING ELEMENTS
Filed May 24, 1951  5 Sheets-Sheet 3
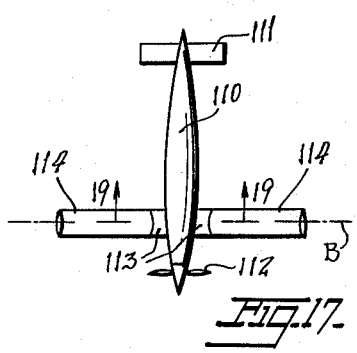
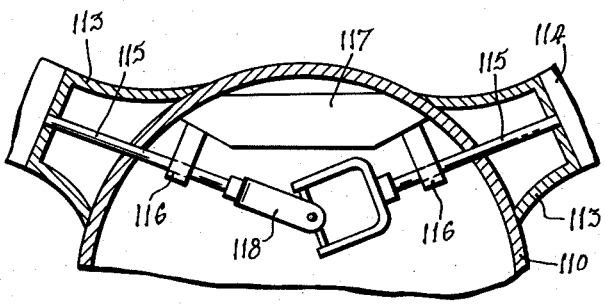
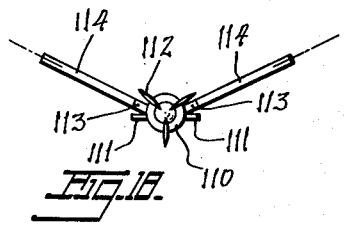
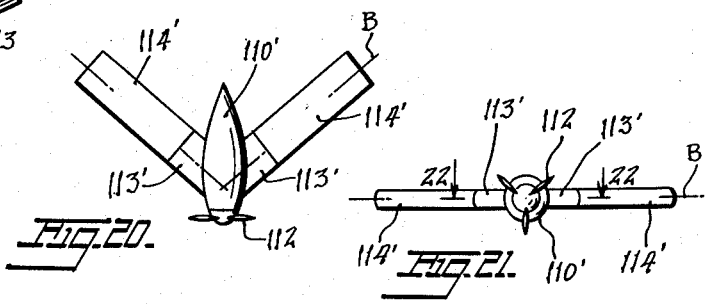
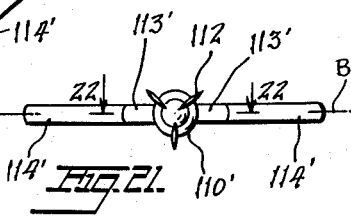
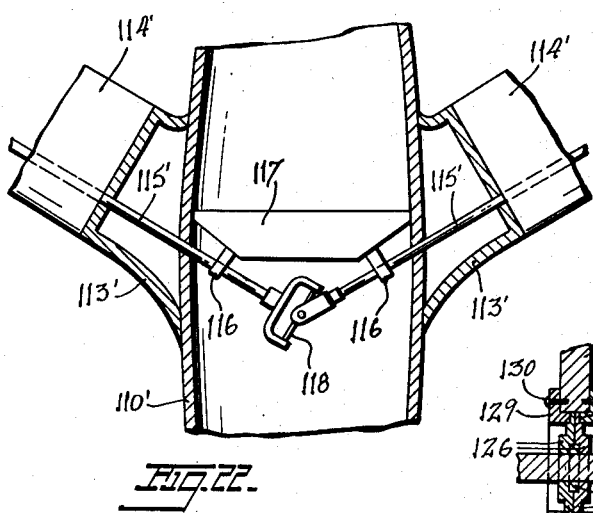
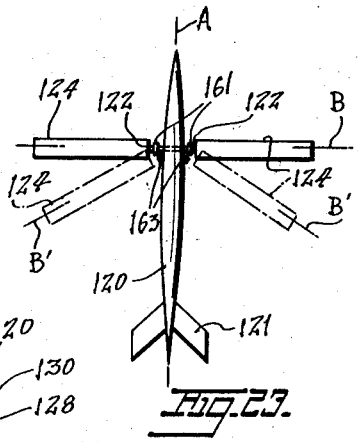
INVENTOR.
PAOLO ORAZI
BY
ATTORNEY

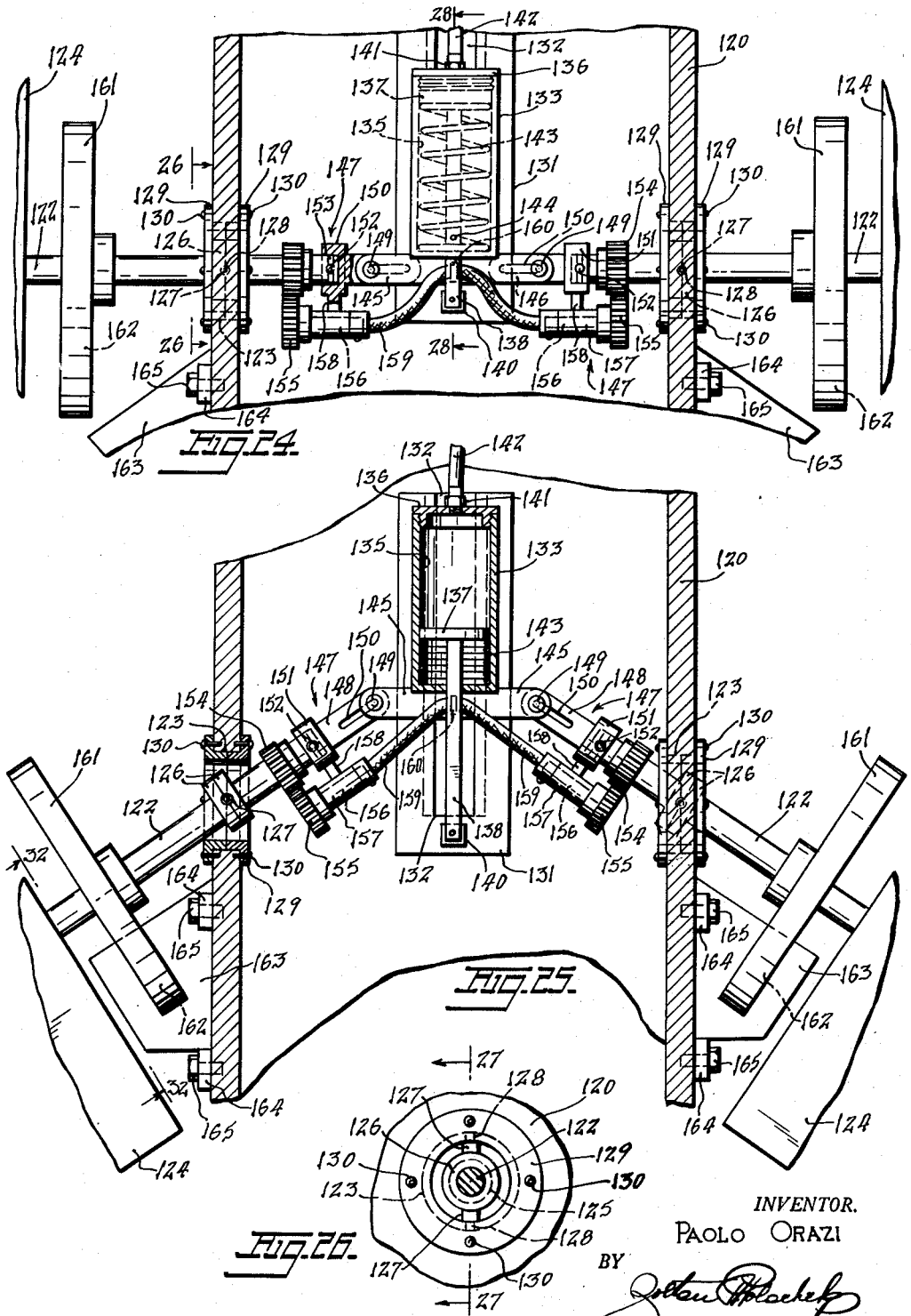

June 22, 1954 P. ORAZI 2,681,775
CONVERTIBLE AIRPLANE HAVING AUTO-ROTATABLE SUSTAINING ELEMENTS
Filed May 24, 1951 5 Sheets-Sheet 5
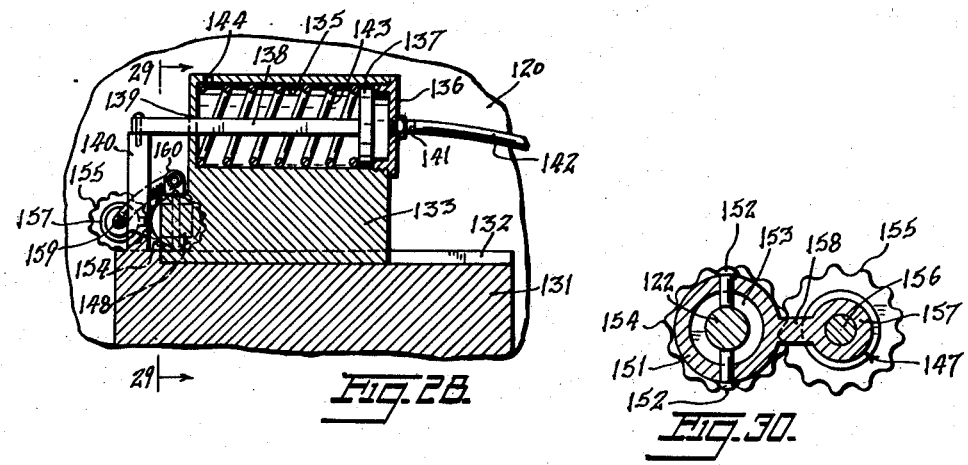
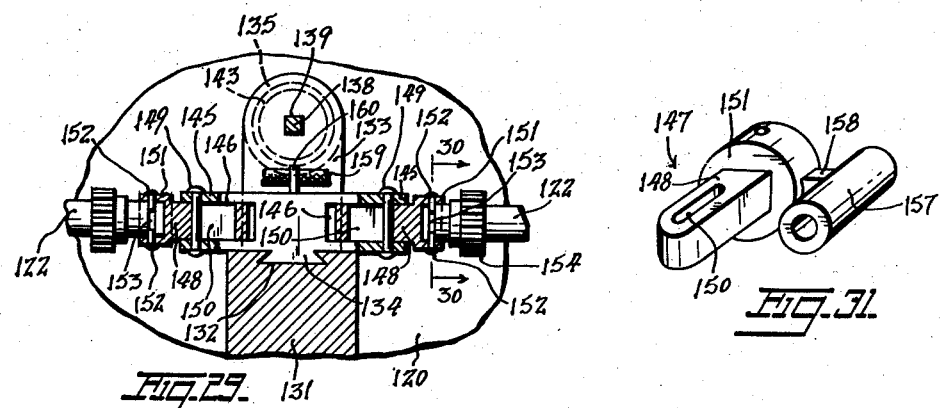
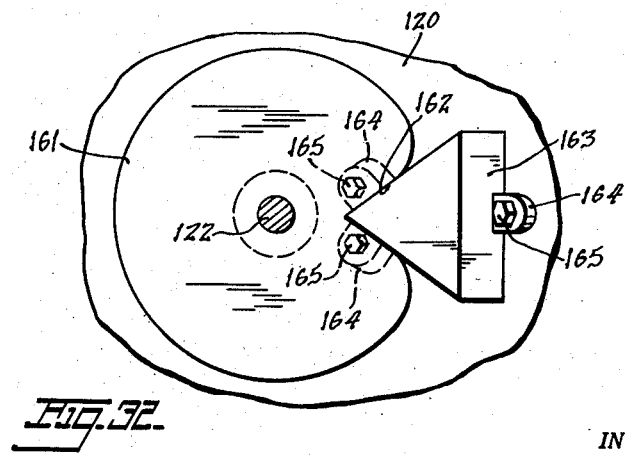
INVENTOR.
PAOLO ORAZI
BY
ATTORNEY Patented June 22, 1954

2,681,775

UNITED STATES PATENT OFFICE 2,681,775

CONVERTIBLE AIRPLANE HAVING AUTO-ROTATABLE SUSTAINING ELEMENTS

Paolo Orazi, Brescia, Italy

Application May 24, 1951, Serial No. 228,078

15 Claims. (Cl. 244—39)

This invention relates to new and useful improvements in aircraft.

More particularly, the present invention proposes the construction of aircraft embodying the principles of rotation of surfaces along longitudinal axes explained in my earlier application Serial No. 146,414 filed February 27, 1950, now Patent No. 2,577,031.

The present invention has as its main purpose the construction of an aircraft of the "heavier-than-air" type which flies as a conventional airplane with its lift surfaces or wings in complete auto-rotation (without any additional lift surfaces excepting the usual tail surfaces) and which employs some power source for producing a forward thrust.

The main advantage of the present construction resides in the ability to construct the aircraft to have very small wings in proportion to the enormous wing load in a manner so that the aircraft is capable of flight at low speeds without in any way effecting the lifting power of those wings.

Another object of the present invention proposes making the wings very small in proportion to wing load to permit the required slower speeds, but the wings are so constructed and provided with means for preventing their auto-rotation so that when the wings are maintained in a fixed position they are capable of permitting the plane to fly at greatly increased rates of speed as a conventional airplane, which conversion is the prime requisite of a convertible airplane.

A further object of the present invention proposes connecting the wings together by having them mounted on the ends of a single shaft or on the outer ends of shaft sections which have adjacent ends connected together and extended rotatively through the fuselage of the aircraft in a manner so that the wings will rotate in unison while maintaining the alignment of the wings.

Still another object of the present invention proposes the provision of novel means within the fuselage of the aircraft or externally thereof for locking the wings against auto-rotation in a manner to permit the increased speeds previously referred to.

The present invention further proposes a novel means for starting auto-rotation of the wings in the proper direction after which the source of power becomes ineffective or can be manually disconnected permitting the wings to continue free rotation.

Still further, the present invention proposes the inclusion of novel means within the fuselage acting on the shaft which rotatively supports the wings for restricting auto-rotation of the wings to a single direction only.

It is a further object of the present invention to construct aircraft which is simple and durable, which is effective for its intended purposes and which can be easily manufactured and offered for sale at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an airplane constructed in accordance with the present invention.

Fig. 2 is an enlarged partial transverse vertical sectional view taken substantially on the line 2—2 of Fig. 1.

Fig. 3 is a partial longitudinal vertical sectional view taken on the line 3—3 of Fig. 2.

Fig. 4 is an enlarged horizontal sectional view taken on the line 4—4 of Fig. 3.

Fig. 5 is an enlarged horizontal sectional view taken on the line 5—5 of Fig. 2.

Fig. 6 is an elevational view of Fig. 5 looking from the right-hand side thereof.

Fig. 7 is an enlarged perspective view of one of the parts used in the portion of the first form of the invention shown in Figs. 5 and 6.

Fig. 8 is a diagrammatic view illustrating the descent action of the aircraft forming the first form of the invention.

Fig. 9 is a view similar to Fig. 1, but illustrating the aircraft constructed in accordance with a modification of the present invention.

Fig. 10 is an enlarged partial transverse vertical sectional view taken substantially on the line 10—10 of Fig. 9.

Fig. 11 is a partial longitudinal vertical sectional view taken on the line 11—11 of Fig. 10.

Fig. 12 is an enlarged horizontal sectional view taken on the line 12—12 of Fig. 11.

Fig. 13 is a partial longitudinal vertical sectional view taken on the line 13—13 of Fig. 10.

Fig. 14 is a diagrammatic view illustrating the descent action of the aircraft forming the second form of the invention illustrated in Figs. 9 to 13.

Fig. 15 is a perspective view of an aircraft constructed in accordance with still another modification of the present invention.

Fig. 16 is an enlarged front elevational view of Fig. 15 with a portion thereof broken away to reveal interior construction.

Fig. 17 is a plan view of an aircraft constructed in accordance with still another modification of the present invention.

Fig. 18 is a front elevational view of Fig. 17.

Fig. 19 is an enlarged partial transverse vertical sectional view taken on the line 19—19 of Fig. 17.

Fig. 20 is a view similar to Fig. 17, but illustrating still another modification of the present invention.

Fig. 21 is a front elevational view of Fig. 20.

Fig. 22 is an enlarged partial transverse horizontal sectional view taken on the line 22—22 of Fig. 21.

Fig. 23 is a plan view of an aircraft constructed in accordance with still another modification of the present invention.

Fig. 24 is a greatly enlarged transverse horizontal sectional view of a portion of the aircraft shown in Fig. 23.

Fig. 25 is a view similar to Fig. 24, but illustrating a different position of the parts and with certain of the parts shown in section.

Fig. 26 is a partial vertical sectional view taken on the line 26—26 of Fig. 24.

Fig. 27 is a vertical sectional view taken on the line 27—27 of Fig. 26.

Fig. 28 is a partial longitudinal sectional view taken on the line 28—28 of Fig. 24.

Fig. 29 is a partial transverse vertical sectional view taken substantially on the line 29—29 of Fig. 28.

Fig. 30 is an enlarged sectional view taken on the line 30—30 of Fig. 29.

Fig. 31 is a perspective view of one of the parts used in the form of the invention shown in Figs. 23 to 30.

Fig. 32 is a vertical sectional view taken on the line 32—32 of Fig. 25.

The aircraft, according to the first form of the present invention shown in Figs. 1 to 8, is characterized by a fuselage 50 provided with a power plant 51 to create a forward thrust parallel to the longitudinal axis A of the fuselage 50, shown in Fig. 1. Any desired type of power plant can be used for producing the forward thrust; however, in this first form of the invention, the power plant comprises a jet engine of conventional construction. If desired, the power plant could be an internal combustion engine within the fuselage 50 for driving a propeller on the nose of the fuselage or any other arrangement of power source.

The fuselage 50 is provided with wings 52 fixedly mounted on the ends of a shaft 53 rotatively extended through the fuselage of the aircraft. Thus, the wings 52 are integral with the shaft and are free to rotate relative to the fuselage about the longitudinal axis B of the shaft 53, see Fig. 1. The fuselage 50 is provided on diametrically opposite sides with short stub wings 54 which are fixed to the sides of the fuselage. The wings 52 form continuations of the stub wings 54 and are free to rotate relative thereto. The mounting of the wings 52 on the rotatively mounted shaft 53 is preferred, but it is appreciated that the rotative mounting of the wings 52 can be accomplished in other ways without departing from the scope or intent of the present disclosure.

The cross-sectional shape of the wings 52 can be varied. If major efficiency is desired when the aircraft is operated with the wings 52 in a stationary position, then wings having an airfoil section which is different at the leading edge in respect to the trailing edge should be used. However, it has been found that maximum efficiency is obtained with the wings in auto-rotation if they have an airfoil section which is symmetrical at the leading and trailing edges. The use of wings having a different airfoil section at the leading and trailing edges does not materially hamper the auto-rotation function but has been more effective with the wings used in a stationary position.

Generally, it is possible that semi-wings turning independently be used, resulting in an aileron and vertical rudder effect of very strong yield. However, for simplicity and dependability of flight, it is advisable to use wings which are fixed with relation to one another, as shown on the drawings. In such an integral construction, the wings 52 assist one another to auto-rotate. To obtain the benefits of ailerons while the aircraft is in flight with the wings 52 auto-rotating, the tail surfaces of the aircraft can be provided with ailerons.

Rotative mounting of the shaft 53 permits rotation of the wings 52 with all other movements of the wings not being possible, except for the fact that the shaft 53 is relatively flexible. The shaft 53 is steady enough to permit the aircraft to attain maximum forward speed without danger of the airplane crashing, and at the same time, the wings 52 are free to turn on the longitudinal axis B of the shaft 53 in the direction of the arrow C, see Fig. 1. In this first form of the invention, the axis of rotation is the same for both wings 52, but other disaligned relationships of the wings is possible.

The aircraft flies with a conventional movement parallel to the longitudinal or thrust axis A and with the wings 52 rotating in the direction of the arrow C. The wings 52 have an airfoil section which is different at the leading edge than at the trailing edge.

As described in the earlier application previously referred to, a flow of air rather normal to the longitudinal axis of the wings 52, as indicated by the dot and dash lines D in Fig. 1, causes the wings 52 to auto-rotate on the longitudinal axis B of the shaft 53 in one or the other direction. With the wings 52 auto-rotating in the direction of the arrow C and when considered in conjunction with the movement of the aircraft along the axis A, a lift is created in the direction of the arrow E, see Fig. 1, sufficient to sustain the aircraft in flight. If the power plant 51 should become inoperative, the aircraft will not glide parallel to the axis A, as a conventional glider would do, but instead the aircraft will descend along a path parallel to the line F, shown in Fig. 8, with the fuselage 50 maintained horizontal. The aircraft always continues its conventional forward flight under the influence of the power plant 51. Thus, the aircraft, with its wings 22 auto-rotating, flies in a forward direction, except that its forward speed is greatly slowed down and movements thereof are controlled by the tail surface 55 which may be provided with a dihedral. One type of dihedrally arranged tail surface 55 is shown in Fig. 1, but it is appreciated that many different kinds can be employed so long as they control banking and elevation of the aircraft in flight. An aircraft constructed in accordance with the present invention, can go through the entire flight program of a conventional aircraft from take-off to landing with the wings 52 auto-rotating or turning and no additional lift surfaces are required.

When the aircraft is taking off it is absolutely necessary to start auto-rotation of the wings 52 in the proper direction after which the wings are to be freed to auto-rotate. The starting of auto-rotation is referred to in the earlier application previously acknowledged and is effected in the present application by providing a worm gear 56 which is rotatively positioned on the shaft 53 within the fuselage 50. The worm gear 56 abuts against a collar 57 pinned to the shaft 53 in a position spaced slightly from the inner face of the fuselage wall. Wound concentrically about the shaft 53, there is a coil spring 58 which has its ends adjacent the worm gear 56 secured thereto by a pin 59. The other end of the coil spring 58 is secured by a pin 60 to a ratchet member 61 rotatively positioned on the shaft 53. On its outer face, the ratchet member 61 is formed with four equally spaced teeth 62, see particularly Fig. 7, which cooperate with a cross pin 63 mounted diametrically through the shaft 53 to limit rotation of the ratchet member 61 to one direction only. The expansive nature of coil spring 58 keeps the outer face of the worm gear 56 against the collar 57 and the teeth 62 of the ratchet member 61 in engagement with the cross pin 63.

Means is provided for turning the worm gear 56 to tightly wind the coil spring 58 about the shaft 53 to store the energy required to effect the auto-rotation of the wings 52. During such turning of the worm gear 56, the cross pin 63 retains the ratchet member 61 from turning. Mechanism to be hereinafter described retains the shaft 53 from turning during winding of the coil spring 58. The turning means is characterized by a worm 64 which is fixed to one end of a short shaft 65 rotatively supported in a bearing bracket 66 bolted to the inner face of the wall of the fuselage 50. A second short shaft 67 is arranged in end alignment with the short shaft 65 and is rotatively supported in a bearing bracket 68 bolted to the inner face of the wall of the fuselage 50. The short shaft 67 is arranged to be driven by an electric motor 69 also mounted on the inner face of the wall of the fuselage. The adjacent ends of the short shafts 65 and 67 are connected by a clutch 70 which is in continual engagement. When the motor is energized, the worm 64 is rotated through the short shafts 65 and 67 and the clutch 70, to rotate the worm gear 56 in the proper direction to wind up the spring 58. The clutch 70 is provided to prevent excessive winding and possible breakage of the spring 58 when it reaches a fully wound condition. When the spring 58 is fully wound, the clutch plates slip so that further winding is impossible. Engagement of the worm gear 56 with the worm 64 prevents rotation of the worm gear 56 in a direction to unwind the spring 58.

The motor 69 is connected in an electric circuit 71, see Fig. 5, which is normally open. Included in the circuit 71, there is a switch 72, located within the fuselage 50 to be conveniently closed by the pilot for energizing the motor 69 to wind up the spring 58. The pilot closes the switch 72 for a sufficient length of time to completely wind up the spring 58 and then reopens the switch to deenergize the motor 69. It being appreciated, of course, that no damage to the spring 58 can be caused by over-winding in view of the inclusion of the clutch 70.

The energy stored in the spring 58 is effective to start auto-rotation of the wings 52, when the shaft 53 is released, with the spring 58 unwinding itself and turning the ratchet member 61 in the direction of the arrow C on Fig. 1. The ratchet member 61 through the medium of its teeth 62 which engage the cross pin 63 will cause the wings 52 and shaft 53 to be turned in the direction of the arrow C. When the energy in the spring 58 has expended itself, auto-rotation of the wings 52 and the shaft 53, in the direction of the arrow C, continues with the cross pin 63 slipping past the teeth 62 of the ratchet member and with the shaft 53 turning relative to the ratchet member 61 and the worm gear 56.

The wings 52 are fixed to the shaft 53 so that the widest axes of the wings, between the leading and trailing edges of the wings, are parallel to each other. With the wings 52 in that position on the shaft 53, it is apparent that the wings when located with their widest axes parallel to the longitudinal or thrust axis A of the fuselage 50 causes the aircraft to be converted to a conventional aircraft in which maximum forward thrust of the power plant 51 is free to drive the aircraft forward at maximum speed. Pinned to the shaft 53, against the other side of the collar 57, there is a ratchet wheel 73, see Figs. 5 and 6, acted upon by a spring pressed pawl 74. The engagement of the spring pressed pawl 74 with the ratchet wheel 73 restricts auto-rotation of the shaft 53 and the wings 52 carried thereby to the direction indicated by the arrow C in Fig. 1. Such means function to prevent auto-rotation in the opposite direction.

Secured to the shaft 53 at the other side of the fuselage 50, there is a disc 75, see Figs. 2 and 3, having a single tooth 76. A locking lever 77 is slidably supported in spaced brackets 78 to slide in a direction radially of the disc 75. The lever 77 is urged toward the disc 75 by an expansion spring 79 engaged about the lever 77 and which operates between the adjacent faces of a collar 80 fixed to the lever 77 between the brackets 78 and the bracket 78 furthest from the disc 75. When the end of the lever 77, adjacent the disc 75, is engaged with the tooth 76, it functions in conjunction with the ratchet wheel 73 and the spring pressed pawl to fixedly lock the wings 22 in position with their widest axes extended parallel to the longitudinal or thrust axis A of the fuselage 50.

Engagement of the locking lever 77 with the tooth 76 of the disc 75 is the mechanism, previously referred to, for preventing rotation of the shaft 53 in the direction of the arrow C during the time that the coil spring 58 is being wound on the shaft 53. When the lever 77 is withdrawn from the tooth 76, the energy stored in the spring 58 expends itself in turning the shaft 53 to start auto-rotation of the wings 52.

Means is provided for holding the locking lever 77 in an operative position engaged with the tooth 76 or in an inoperative position disengaged from the tooth 76. That holding means is best illustrated in Fig. 4 and comprises a pin 81 slidably extended through the end of the locking lever 77 remote from the disc 75. The outer end of the pin 81 is engageable in a recess 82 in the inoperative position of the locking lever 77 or in a recess 83 in the operative position of the lever. The recesses 82 and 83 are formed in the wall of the fuselage or in some other fixed part of the aircraft.

Fixed on the pin 81, there is a collar 84 and an expansion spring 85 coaxially wound on the pin 81 acts between the adjacent faces of the collar 84 and the end of the locking lever 77 for holding the pin 81 in position engaged with the recess 82 or in the recess 83. The end of the pin 81 remote from the recesses 82 and 83 is formed with an enlarged head 86 which can be gripped to pull the pin 81 against the action of the spring 85 to disengage the end of the pin from the recess 82 or 83 with which it is engaged.

It is easy to see that the aircraft with the auto-rotating wings 52 will have flight characteristics and speeds different from conventional aircraft as a result of the difference in the ratio of lift to drag.

The aircraft, especially if controlled by a pilot, is stable laterally even without dihedral in the wings 22, if some caution is taken to balance any torque that might be present. Such torque can be counteracted, for example, by having the tail surfaces at the dihedral shown in Fig. 1.

Lateral stability of the aircraft, without dihedral of the wings 52, can be further accomplished by having the shaft 53 rather long and slightly flexible, as previously indicated. With the shaft 53 flexible, smooth flight results and also causes the wings 52 to be disposed, while turning, along a flat crescent arc with the ends thereof turned upward similar to the slight conventional dihedral. That curvature of the shaft 53 is caused by the weight of the fuselage 50 at the center of the shaft and by the aerodynamic forces acting on the ends of the wings 52.

The aircraft of the present invention is one which is capable of conventional flight but which has its wings arranged for auto-rotation when desired. However, it is possible to construct aircraft for flight at very low speeds only in which the wings are free to auto-rotate at all times while air borne. In such aircraft there will be no need to stop auto-rotation and the mechanism for that purpose previously described will not be needed. Furthermore, the mechanism for restricting auto-rotation to a single direction is not absolutely necessary but will be found useful. In an aircraft designed for slow speeds only, it is suggested that the tail surfaces be larger than normal because of the very low speed of flight.

The modification of the invention shown in Figs. 9 to 14 is similar to that described in connection with Figs. 1 to 8, differing in the substitution of a different power plant and in a different means for effecting auto-rotation.

In the modifications of Figs. 9 to 14, the power plant is characterized by an internal combustion engine within the fuselage for driving a propeller 51' on the nose of the fuselage.

The different means for starting auto-rotation of the shaft 53 and so the wings 52 is best shown in Fig. 10, and comprises a bevel gear 86 mounted on the shaft 53 within the fuselage 50. The bevel gear 86 meshes with a second bevel gear 87 mounted on the top end of a shaft 88 which extends from a clutch mechanism 89 mounted on the floor 90 of the fuselage 50. Extending forwardly from the clutch mechanism 89, there is a shaft 91 connected in any desired way to the internal combustion engine which drives the propeller 51'. The clutch mechanism 89 is provided with a manual control handle 92, which should be located within convenient reach of the pilot, by which the clutch mechanism 89 can be opened and closed. Further constructional details of the clutch mechanism 89 will not be given in this description as they are generally known in the art; however, the clutch mechanism, if desired, can be electrically operated by a control button on the pilot's instrument panel.

When the aircraft is about to take off, the control handle 92 of the clutch mechanism 89 is left in the position in which the clutch is closed so that the shaft 53 and the wings 52 will be rotated in the direction of the arrow C, see Fig. 9. When the aircraft is air-borne, the handle 92 is moved in a direction to open the clutch mechanism 89 and free the shaft 53 from the internal combustion engine. The wings 52 are then free to auto-rotate under the influence of the air flowing past the wings 52.

With the construction of Figs. 9 to 14, it is possible to leave the control handle 92 of the clutch mechanism 89 in a closed position during the entire flight of the aircraft, so that the wings 52 will be mechanically driven by the plane's power plant. With the wings auto-rotating and the power plant developing maximum forward thrust, strong climbing is obtained in proportion to the stretch of the wings and the size of the aircraft; and at the same time very slow speeds can be obtained while taking off and landing. However, a different flight pattern can be obtained with a combination of conventional forward thrust along the axis A and with the wings 52 rotated mechanically in the direction of the arrow C. In such case, the characteristics described above are exaggerated and all kinds of flight patterns can be had by varying the combination; that is, by increasing or decreasing the forward thrust along the axis A or by increasing or decreasing the number of revolutions of the wings 52 in the direction of the arrow C. For example, an increase in thrust power with a constant number of revolutions of the wings 52, or vice versa, causes a very strong increase of lift. If the number of revolutions of the wings 52 is held constant, with a change in forward thrust, the number of revolutions is not the same as when the wings are left free to auto-rotate; as the number of revolutions of the wings in auto-rotation increases and decreases as the speed of forward thrust is increased and decreased.

In all other respects, the form of the invention shown in Figs. 9 to 14 is similar to that illustrated and described in connection with Figs. 1 to 8 and like parts are identified by the same reference numerals.

Other means than that shown on the drawings can be used for locking the shafts and wings carried thereby against rotation especially while the aircraft is in a transition flight period. Any known type of brake can be used and is not illustrated because such brakes are generally known and their adaption to the discs 75 of Figs. 3 and 11 is apparent without specific illustration. Such brake could be of the type commonly employed on automobiles and could be operated at the will of the pilot making it possible to obtain a smooth change from auto-rotation to a position in which the wings will be held against rotation and vice versa. However, any other means suitable for fixing the blades firmly to the fuselage or other stationary parts in order to increase the aircraft's sturdiness in flight can be employed without departing from the scope and intent of the present invention. Such braking is described in my prior patent application No. 146,415 filed February 27, 1950 now Pat. No. 2,577,031 for the purpose of making a convertible airplane achieve more sturdiness during flight with the wings stationary for increased forward speed.

To obtain sturdiness during flight with the wings stationary the common mechanical male-female system can be used for holding the wings in which the males enter the females at will and such devices can be installed at adjacent surfaces of the wings and fuselage where locking is to be achieved.

In Figs. 15 and 16, there is illustrated an aircraft of slightly different design for obtaining lateral stability. In this aircraft there is a pair of adjacent fuselages 100 connected together at their rear ends by a rigid tail assembly 101. Extended inward from the adjacent faces of the fuselages 100 adjacent their front ends, there are end aligned stub wings 102, spanned by a rotatively supported shaft 103, see Fig. 16. The shaft 103 carries a wing 104 which is free to auto-rotate about the longitudinal axis of the shaft. Extended from the outer sides of the fuselages 100, there is a pair of stationary wings 105 dihedrally fixed.

The aircraft of Figs. 15 and 16 is provided within the fuselages 100 with power plants for creating a forward thrust and can be provided with the mechanism of the previous forms of the invention for starting auto-rotation of the wing 104, for limiting auto-rotation to one direction and for holding the wing against auto-rotation, if desired.

The modification of the invention shown in Figs. 17 to 19 proposes an aircraft having dihedrally positioned auto-rotating wings. That aircraft has a fuselage 110 provided at its rear end with a tail assembly 111 with an engine driven propeller 112 at its forward end for developing a forward thrust parallel to the longitudinal axis of the fuselage. Extending laterally from the sides of the fuselage 110 there are short stub wings 113 inclined upward and outward from the sides of the fuselage.

Wings 114 are fixedly mounted on shaft sections 115 which are rotatively extended through the stub wings 113 and into the fuselage 110. The inner ends of the shaft sections 115 are rotatively supported in brackets 116 fixed to a stationary part 117 of the fuselage 110. Between the brackets 116, the inner ends of the shaft sections 115 are connected together for unitary rotative movement by means of a universal joint 118. The universal joint 118 functions to permit auto-rotation of the shaft sections 115 and the wings 114 carried thereby and maintains the greatest widths of the wings 114 parallel to one another.

The universal joint 118 makes the wings 114 turn dependently and steadily as though they were interconnected by the single shaft used in the first forms of the present invention, while at the same time permitting the wings 114 to be mounted with a dihedral to improve lateral stability. If the bearing brackets 116 are spaced sufficiently, friction between the parts will be greatly reduced.

In Figs. 20 to 22, there is illustrated a fuselage 110' having swept back auto-rotating wings 114' completely eliminating the need for a tail assembly on the rear end of the fuselage 110'. The wings 114' form continuations of swept back stub wings 113' which extend laterally from the sides of the fuselage 110'. The mechanism for interconnecting the shafts 115' which carry the wings 114' is similar to that described in connection with the form of the invention shown in Figs. 17 to 19 and in Fig. 22 parts similar to those shown in Fig. 19 are identified by the same reference numeral.

Turning now to the final form of the invention shown in Figs. 23 to 32, the aircraft includes a fuselage 120 which is provided at its rear end with a conventional tail assembly 121. The fuselage 120 is not illustrated with any particular power plant for producing a forward thrust along the longitudinal axis A of the fuselage, but can be provided with a jet engine, or an engine driven propeller for that purpose, all within the scope of the present invention.

Extending laterally from opposite sides of the fuselage 120 there is a pair of end aligned shaft sections 122 which have their inner ends projected into the fuselage 120 through enlarged holes 123 formed in the sides thereof. Wings 124 are fixedly mounted on the outer ends of the shaft sections 122.

At the points where the shaft sections 122 enter the fuselage 120 through the holes 123, means is provided for permitting auto-rotation of the shafts 122 about their longitudinal axes B while at the same time permitting turning of the shaft on vertical axes to swept back positions shown in dot and dash lines in Fig. 23 and in full lines in Fig. 25. Within the holes 123, the shaft sections 122 have collars 125 fixedly secured thereto, see particularly Fig. 27, which are housed rotatively within adjacent rings 126. The rings 126 are formed at their tops and bottoms with aligned semi-circular trunnion members 127 which are engaged into complementary semi-circular sockets 128 formed in the adjacent contacting edges of retaining rings 129 positioned in the holes 123. The retaining rings 129 are secured to the material of the fuselage wall surrounding the holes 123 by means of rivets 130. The formations within the holes 123 permits the shaft sections 122 and the wings 124 carried thereby to autorotate freely about the axis B and further permits the shaft sections 122 and the wings 124 to be turned on the vertical axis of the trunnion members 127 to positions in which the longitudinal axes B of the shaft sections are swept back as indicated at B' in Fig. 23.

Mechanism is provided within the fuselage 120 for moving the shaft sections 122 between the positions B and B' shown in Fig. 23. That moving mechanism includes a base member 131 fixedly mounted within the fuselage 120. The top face of the base member is formed with a dovetailed track 132 which opens to the front end of the base member 131, see Fig. 28. Resting on the top face of the base member 131, there is a slide member 133 which is formed at its bottom with a dovetailed projection 134 which engages the dovetailed track 132 so as to restrict the slide member 133 to forward and rearward movement with relation to the base member 131.

At its top, the slide member 133 is formed with a cylinder 135 which opens to the front end of the slide member 133 and which is closed at its front end by a cap 136 which is threadedly engaged in position. Slidably positioned within the cylinder 135, there is a piston 137 from which a piston rod 138 extends rearwardly. The free end of the piston rod 139 extends slidably through a hole 139 in the rear wall of the cylinder 135 and has its outer end pinned to the top end of a post 140 which extends from the base member 131 beyond the rear end of the dovetailed track 132. Attached to the cap 136, there is a connector 141 which serves to attach the end of a flexible hose 142 to the cylinder 135. The other end of the hose 142 is connected to a manually controllable source of fluid under pressure to be fed into the cylinder 135 behind the piston 137 to cause the slide member 133 to be slid forward relative to the base member 131. Positioned within the cylinder 135, there is a strong spring 143 which functions to maintain the slide member 133 in a rearward position on the base member 131 in which the piston 137 abuts the closure cap 136. At its rear end, the cylinder 135 is formed with a bleed hole 144 so that the piston 137 is not air locked within the cylinder 135.

Arm portions 145 extend laterally from the sides of the slide member 133 at the rear end thereof and each of the arm portions 145 has a horizontal cutout 146 extended in from the outer end thereof. Connected to each of the arm portions 145, there is a fitment 147. One of the fitments 147 is shown in detail in Fig. 31 and each includes a main portion 148 arranged in end alignment with the arm portions 145 and having their inner ends projected into the cutouts 146. The inner ends of the main portion 148 are slidably and pivotally connected to the arm portions 145 by means of pins 149 carried by the arm portions 145 and which pass through elongated slots 150 formed in the inner ends of the main portions 148.

The main portions 148 of the fitments 147 are square in cross-section and are formed at their outer ends with circular sockets 151 into which the inner ends of the shaft sections 122 are rotatively engaged. The inner ends of the shaft sections 122 are retained in position within the sockets 151 by means of pins 152 which extend inward from diametrically opposite sides of the sockets 151 and engage circumferential grooves 153 formed in the inner ends of the shaft sections 122.

Thus, movement of the slide member 133 on the base member 131 will cause the shaft sections 122 to be turned on the vertical axes of the trunnion members 127 without interfering with the auto-rotation of the shaft sections 122 and the wings 124 about the longitudinal axes B of the shaft sections 122. However, means is provided for interconnecting the shaft sections 122 to insure dependent auto-rotation of those shaft sections to maintain the wings 124 in position with their widest dimensions between the leading and trailing edges of the wings in parallel alignment.

The interconnecting means for the shaft sections 122, comprises a gear 154 carried by each of the shaft sections 122 closely adjacent the sockets 151 of the fitments 147. The gears 154 in turn mesh with gears 155 carried by short stud shafts 156 extended rotatively through tubular bearings 157 forming parts of the fitments 147. The tubular bearings are connected to the main portions 148 of the fitments 147 by webs 158. Connected between the inner ends of the stud shafts 156 there is a flexible cable 159. The intermediate portion of the cable 159 is passed slidably through a lug 160 which extends upward from the slide member 133 below the extended end of the piston rod 138. The cable 159 is of sufficient length so as not to interfere with the movements of the shaft sections 122 and at the same time interconnects those shaft sections to insure unitary rotation thereof.

When the wings 124 are extended laterally at right angles from the sides of the fuselage 120, shown in full lines in Fig. 23 and in Fig. 24, the shaft sections 122 and the wings 124 are free to auto-rotate on the longitudinal axes B of the shaft sections. There can be provided within the fuselage 120 any of the previously described mechanisms for starting such auto-rotation, for limiting auto-rotation to one direction and even for blocking such auto-rotation, if desired. However, when the wings 124 are shifted to the swept back position, shown in dot and dash lines in Fig. 23 and in Fig. 25, means is provided for blocking auto-rotation of the wings 124 so that the aircraft can be flown at increased forward speeds under the influence of the forward thrust of the power plant contained within the fuselage 120.

The auto-rotation blocking means comprises discs 161, see particularly Figs. 24, 25 and 32, mounted on the shaft sections 122 between the inner ends of the wings 124 and the sides of the fuselage 120. The discs 161 are fixed to the shaft sections 122 and are formed with V-shaped cutouts 162. The cutouts 162 of the two discs 161 are in exact alignment. Secured to the outer sides of the fuselage 120 rearward of the shaft sections 122, there are V-shaped stop blocks 163. Each of the stop blocks 163 is formed with several lugs 164 by which the blocks 163 are secured to the fuselage 120 by means of bolts 165.

From Fig. 24, it will be appreciated that when the wings 124 are in position for auto-rotation, the peripheries of the discs 161 are spaced just slightly forward from the leading edges of the V-shaped stop blocks 163. However, the moment movement of the slide member 133 is started for pivoting the shaft sections 122 rearward to move the wings 124 to swept back positions, the discs 161 begin moving rearward so that the leading edges of the stop blocks 163 will enter the V-shaped cutouts 162 to arrest further auto-rotation. As rearward pivoting of the shaft sections 122 is continued, the stop blocks 163 move further into the cutouts 162 until the position of Figs. 25 and 32 is reached in which the wings 124 will be held against all possible rotation about the shifted longitudinal axes B' of the shaft sections. It is appreciated, of course, that the inner ends of the V-shaped cutouts 162 are located on the plane of the widest point between the leading and trailing edges of the wings 124 so that the wings 124 will be stopped in a horizontal position with relation to the longitudinal or thrust axis A of the fuselage 120.

From the foregoing description of the present invention, it is apparent that the aircraft in accordance with the present disclosure has its wings free to auto-rotate and it is to be understood that these are distinct configurations, or to be mechanically driven at a fixed rate of speed. Such rotative movement of the wings has been useful in slowing down the excessive forward thrust produced in present day military type aircraft making it possible for such aircraft to take off and land on the decks of aircraft carriers more safely at slower speeds. Furthermore, the auto-rotating wings can be used for slowing down the forward speed of military aircraft when used for observation purposes over enemy lines, or enemy held territory. The foregoing description will obviously suggest other uses of the present aircraft for both military and civilian needs.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an aircraft, a fuselage, a power plant on said fuselage for producing a forward thrust, a shaft supported to extend laterally to the longitudinal axis of said fuselage, and wings carried by the shaft to auto-rotate relative to the fuselage, said shaft being formed of separate shaft sections having adjoining ends connected together by a universal joint, said shaft sections being rotatively supported on said fuselage to have said wings dihedrally set.

2. In an aircraft, a fuselage, a power plant on said fuselage for producing a forward thrust, a shaft supported to extend laterally to the longitudinal axis of said aircraft, and wings carried by the shaft to auto-rotate relative to the fuselage about spanwise axes, said shaft being formed of separate shaft sections extending oppositely outwardly and having their inner ends connected together by a universal joint, said shaft sections being rotatively supported on said fuselage and having at least one operative configuration wherein said wings are in swept back position.

3. In an aircraft, a fuselage, a power plant on said fuselage for producing a forward thrust, a shaft supported to extend laterally to the longitudinal axis of said fuselage, and wings carried by the shaft to auto-rotate relative to the fuselage, said shaft being rotatively extended through said fuselage, and means acting on said shaft for limiting auto-rotation of said shaft and the wings mounted thereon to one direction only.

4. In an aircraft, a fuselage, a power plant on said fuselage for producing a forward thrust, shaft sections extended into said fuselage from the sides thereof to auto-rotate on their longitudinal axes and to be pivoted about vertical axes to extend laterally from the sides of said fuselage or in swept back positions, and wings carried by the shafts to auto-rotate therewith relative to the fuselage.

5. In an aircraft, a fuselage, a power plant on said fuselage for producing a forward thrust, shaft sections extended into said fuselage from the sides thereof to auto-rotate on their longitudinal axes and to be pivoted about vertical axes to extend laterally from the sides of said fuselage or in swept back positions, and wings carried by the shafts to auto-rotate therewith relative to the fuselage, and means within said fuselage for turning said shaft sections on said vertical axes to move said shaft sections between their two possible positions.

6. In an aircraft, a fuselage, a power plant on said fuselage for producing a forward thrust, shaft sections extended into said fuselage from the sides thereof to auto-rotate on their longitudinal axes and to be pivoted about vertical axes to extend laterally from the sides of said fuselage or in swept back positions, and wings carried by the shafts to auto-rotate therewith relative to the fuselage, and means within said fuselage for turning said shaft sections on said vertical axes to move said shaft sections between their two possible positions, and means for arresting auto-rotation of said shaft sections and the wings carried thereby when said shaft sections are moved to their swept back positions.

7. An airplane comprising a fuselage and wings mounted on opposite sides of said fuselage for rotation about spanwise axes, said wings having at least one operative configuration wherein said axes are disposed with respect to each other at an angle of less than 180°.

8. An airplane as set forth in claim 7 including means for varying the angle at which said wings are disposed to each other.

9. An airplane as set forth in claim 8, including shafts on which respective wings are mounted, means for rotating said shafts, said shafts having adjoining ends, and a universal joint joining said shafts at said adjoining ends.

10. An airplane comprising a fuselage and wings mounted on opposite sides of said fuselage for rotation about spanwise axes, said wings having at least one operative configuration wherein said axes are disposed with respect to each other at an angle of less than 180°, including means for optionally rotating said wings or holding them in a fixed predetermined position.

11. An airplane as set forth in claim 10, and means for varying the angle between said axes during the course of flight.

12. An airplane comprising a fuselage and wings mounted on opposite sides of said fuselage for rotation about spanwise axes, said wings having at least one operative configuration wherein said axes are disposed with respect to each other at an angle of less than 180°, including means for varying the angle between said axes comprising a force exerting mechanism, said wings being mounted on respective axes for pivoting bodily to vary said angle and having adjoining ends simultaneously actuatable by said force exerting mechanism to effect selective variation of angularity.

13. An airplane as set forth in claim 12, including a flexible torque transmitting element intermediate said adjoining ends and rotatively coupled thereto so as to insure synchronized rotation of said wings, said element being yieldable with bodily pivotal motion of said wings to maintain synchronization at all operable angles between said spanwise axes.

14. An airplane comprising a fuselage and wings mounted on opposite sides of said fuselage for rotation about spanwise axes, said wings having at least one operative configuration wherein said axes are disposed with respect to each other at an angle of less than 180°, including propelling means for effecting direct thrust in the direction of the longitudinal axis of said fuselage, means for effecting forced rotation of said wings, and means for securing said wings in stationary position relative said fuselage whereby they are non-rotative with respect thereto.

15. An airplane as set forth in claim 14, including means for varying the angle between said axes.

References Cited in the file of this patent

UNITED STATES PATENTS

| Number | Name | Date |
|---|---|---|
| 1,825,493 | Wander | Sept. 29, 1931 |
| 2,424,889 | Holmes | July 29, 1947 |
| 2,577,031 | Orazi | Dec. 4, 1951 |

FOREIGN PATENTS

| Number | Country | Date |
|---|---|---|
| 424,140 | Great Britain | Feb. 15, 1935 |